United States Patent
Bellot

[11] Patent Number: 6,138,982
[45] Date of Patent: Oct. 31, 2000

[54] DEVICE FOR PRODUCING AT LEAST A PORTION OF A TIRE MOLD COMPRISING AT LEAST ONE ELEMENT MOLDING A NON-REMOVABLE MOTIF

[75] Inventor: Guy Bellot, Chanat-la Mouteyre, France

[73] Assignee: Compagnie Générale des Etablissements Michelin-Michelin & Cie, Clermont-Ferrand Cedex, France

[21] Appl. No.: 09/144,780

[22] Filed: Sep. 1, 1998

Related U.S. Application Data

[62] Division of application No. 08/585,971, Jan. 16, 1996, Pat. No. 5,843,326.

[30] Foreign Application Priority Data

Jan. 18, 1995 [FR] France .................................. 95 00618

[51] Int. Cl.[7] .......................... B29C 33/12; B22D 19/00
[52] U.S. Cl. .............................. 249/91; 164/9; 164/112; 249/94; 249/96
[58] Field of Search .................................. 164/9, 10, 98, 164/108, 112; 249/83, 91, 94, 96

[56] References Cited

U.S. PATENT DOCUMENTS

| | | | |
|---|---|---|---|
| 2,263,001 | 11/1941 | Gunsaulus et al. | 164/10 |
| 2,765,508 | 10/1956 | Spitler | 164/10 |
| 2,770,013 | 11/1956 | Crooker | 425/28.1 |
| 2,896,281 | 7/1959 | Miller et al. | 164/10 |
| 3,283,053 | 11/1966 | Felker | 425/28.1 |
| 3,415,923 | 12/1968 | Petersen | 164/10 |
| 3,431,601 | 3/1969 | Lipscomb | 425/195 |
| 3,692,090 | 9/1972 | Brobeck et al. | 164/98 |
| 4,023,268 | 5/1977 | Momchilov | 425/28.1 |
| 4,029,388 | 6/1977 | Knoll | 249/96 |
| 4,372,524 | 2/1983 | Pailler | 249/79 |
| 4,580,959 | 4/1986 | Pizzorno et al. | 425/47 |
| 4,705,471 | 11/1987 | Shah et al. | 425/195 |
| 4,708,609 | 11/1987 | Yoda et al. | 425/280 |
| 5,340,294 | 8/1994 | Kata | 425/32 |

FOREIGN PATENT DOCUMENTS

| | | |
|---|---|---|
| 1203290 | 1/1960 | France . |
| 1585100 | 1/1970 | France . |
| 2071797 | 9/1971 | France . |
| 748818 | 5/1956 | United Kingdom . |

*Primary Examiner*—James P. Mackey
*Attorney, Agent, or Firm*—Baker Botts L.L.P.

[57] ABSTRACT

A device for making a mold for molding at least a portion of a tread of a tire using a countermold and a pourable, solidifiable material. Molding elements are transferred from the countermold and imbedded in the tire tread mold in protruding fashion by placing each molding element in a housing of the countermold before the actual molding of the tire tread mold and in such a manner as to permit easy transfer from the countermold to the tire tread mold.

5 Claims, 4 Drawing Sheets

DEVICE FOR PRODUCING AT LEAST A PORTION OF A TIRE MOLD COMPRISING AT LEAST ONE ELEMENT MOLDING A NON-REMOVABLE MOTIF

This is a division of application Ser. No. 08/585,971 filed Jan. 16, 1996, now U.S. Pat. No. 5,843,326.

BACKGROUND OF THE INVENTION

The present invention relates to a process for producing a mold intended for the molding of at least a portion of a tread of a tire. More particularly, it concerns a process for molding the mold of a tire on a countermold, said countermold being provided with separately made elements in relief which protrude from the molding surface of said countermold. The portion which protrudes is intended to be inserted and anchored in the mold during the pouring of said mold.

When it is desired to produce a tread pattern of a tire comprising one or more fine slits, that is to say relatively deep slits of a thickness less than or equal to 2.5 mm, elements in the form of metal blades are produced separately before incorporating them in the mold for said tread; the blades are in general of steel so as to have sufficient rigidity to permit a large number of moldings of tires without change in the geometry of said blades.

French patent 2 430 838 describes, for the production of a mold which has blades, a process which consists in machining a countermold on a lathe and then producing fine slits in said countermold by means of a spark erosion process, each slit having a geometry which corresponds precisely to the geometry of the blade which is intended to be inserted therein before proceeding with the pouring of aluminum for forming the mold.

Such a process permits the putting in place only of blades of removable shape, since once the casting has solidified, the blades are partially inserted in the mold and their extraction from the countermold can be effected only by relative sliding in their respective housings in the countermold in a predetermined direction of removal.

The improvement in the performance required from tires has led to the conceiving of tire tread patterns containing fine slits which have large variations in geometry in the thickness of the tread of said tire. One example of this type of slit is described, for instance, in French patent application FR 2 641 501. In such cases, the blades have non-removable shapes which makes the process described in French patent 2 430 838 entirely inoperative. It should be noted that, in connection with the molding of a tire tread, the removal of the blades from the mold is possible due to the deformability and elasticity of the materials constituting said tread.

French patent FR 1 203 290 describes another process for manufacturing a tire mold by molding on a plaster countermold in which metal blades are partially embedded at the time of the production of the countermold. After solidification of the pouring on said plaster countermold, the blades which are firmly anchored in the mold are freed from the plaster countermold by breaking the latter, which of course makes it impossible to use the countermold for another molding. While this process makes it possible readily to produce a mold having non-removable blades, it is unfortunately a lengthy one to carry out and is particularly expensive since it requires the production of a new plaster countermold upon each molding of a tire mold.

SUMMARY OF THE INVENTION

The object of the present invention is to propose both a molding process by pouring a mold intended for the molding of at least a portion of a tire tread which comprises at least one non-removable element which protrudes from said mold, said process not having the drawbacks of the processes which have just been described. Each non-removable element is separately made before being partially anchored in the mold at the time of the pouring of said mold.

Another object of the invention is to provide a device intended specifically for the carrying out of the process of the invention which assures a precise positioning of each non-removable protruding element in the countermold while permitting easy removal from the mold after solidification of the pouring of said mold.

In accordance with the invention, in order to produce a mold used for the molding of at least a portion of the tread of a tire having a tread pattern of given shape, said mold being provided with at least one non-removable motif, a molding process is defined which comprises the following steps:

for each non-removable motif, there is produced at least one molding element comprising a first portion which defines said motif and a second portion located in the extension of the first portion and which constitutes the anchoring of said element in said mold;

a countermold is produced, designed to be imparted thereto a mold-removal movement in a predetermined direction, having a molding surface which, aside from the non-removable motif or motifs, corresponds essentially to said tread pattern and in which there is present, at the place of each non-removable motif, a housing which opens via an opening in the molding surface and the contour of which includes at least the contour circumscribed on the projection, on said molding surface in the mold-removal direction, of all the points of said non-removable motif, said housing being defined in said countermold by the extension of the contour of said housing in the mold-removal direction;

with each molding element there is associated a means for producing the continuity of the surface of the countermold in the vicinity of said molding element when the latter is in place in the corresponding housing on the countermold, and for maintaining said molding element in place;

the countermold and the molding element or elements are assembled, each molding element being equipped with the associated means;

the molding of the mold on the countermold is effected by means of a suitable pourable and solidifiable material;

the mold is removed from its countermold by removing each molding element from its housing in the mold-removal direction, the second portion of each element remaining attached to said mold.

A non-removable motif can be defined as a motif which comprises at least one undercut in its shape, so that if the molding element used for the molding of said motif is imprisoned in a rigid material, there is no possible sliding between the element and the material covering it, and this whatever the direction of mold removal which can be contemplated. By rigid, there is understood a material which does not submit sufficient elastic deformation in order to be able to remove the element from the mold, in contrast to the material composing the tread of a tire.

The means associated with each molding element has the role of effecting the closing of the housing and therefore the tightness of the housing in which the first portion of said element is inserted in order to prevent the pouring material of the mold from filling said housing, while assuring the geometrical continuity of the surface of the countermold in the vicinity of said element. The associated means also has the role of permitting satisfactory holding of said element in its corresponding housing in the countermold so as to avoid any displacement of the element during the molding of the mold.

One of the advantages of the process forming the object of the invention is that it permits the manufacture, from the same countermold, of any number of molds having molding elements of non-removable shape within a shorter time and at a lower cost than with the processes used up to now.

The present invention also relates to a device which permits the putting in place and mold removal of at least one molding element in a countermold comprising a molding surface intended for the molding, by means of the pouring of a pourable material, of a mold for at least partially molding a tire tread. Each molding element comprises two portions separated by a frontier; a first portion defines a non-removable motif and is intended to be introduced into a housing developed in the countermold, and a second portion, located in the extension of the first part, protrudes from the molding surface of the countermold and is intended to be engaged in the pouring material forming the mold. By frontier, there is to be understood the trace on the surface of the molding element of the intersection of said surface with the molding surface of the mold.

The device in accordance with the invention comprises at least one part which can be placed in contact with the molding element at least at the frontier between the first portion and the second portion in order to form a drawer assembly, which assembly may first be introduced partially into the housing up to the desired position of the molding element in the countermold, said assembly, when in place in its housing, assuring the continuity of the surface of the countermold in the vicinity of the element while preventing the introduction of the pouring material into the housing during the pouring and, in a second stage, that is to say after solidification of the material of the pouring, capable of being extracted from said housing before being disassembled in order to free the first portion from the molding element.

The device in accordance with the invention assures both the closing of the housing in which the first portion of the element is placed and the holding of said element during the operation of the pouring of the mold.

In accordance with a first embodiment, at least one part is produced, which then completely clamps the first part of the molding element.

One manner of obtaining a device in accordance with this first embodiment is to mold a single part around the first portion of the molding element by means of a pourable and solidifiable material, such part reproducing on its outer faces the geometry of the housing into which it is intended to be introduced with the element. The material constituting the part molded around the first portion of the element is separable from said portion after extraction from the housing and removal from the mold.

In this latter case, the volume of the molding thus produced, including the first portion of the element, corresponds precisely to the volume of the housing provided in the countermold in order to receive the device clamping the first portion of the molding element. One may use either materials (plaster, sand, alloy of low melting point, etc.) which will be destroyed after removal from the mold or (thermoplastic, etc.) materials, which offer the advantage of permitting the reuse of the molding due to their elastic characteristics which permit the assembling and disassembling of said molding and of the element by simple elastic deformation of said molding .

In this latter case, this same molded part can advantageously be used again in order to surround another molding element of the same shape and produce another mold.

In accordance with a second embodiment of the device, it is composed of at least one part intended to partially or completely surround the portion of the molding element protruding from the molding surface of the countermold; in this second embodiment, the device is intended to be incorporated, in the same way as the second portion of the element, in final manner in the mold.

DESCRIPTION OF THE DRAWINGS

A better understanding of the invention and its advantages will be obtained from the figures accompanying the present description which show examples of use, these examples being in no way limitative.

DESCRIPTION OF PREFERRED EMBODIMENTS

Figure 1:
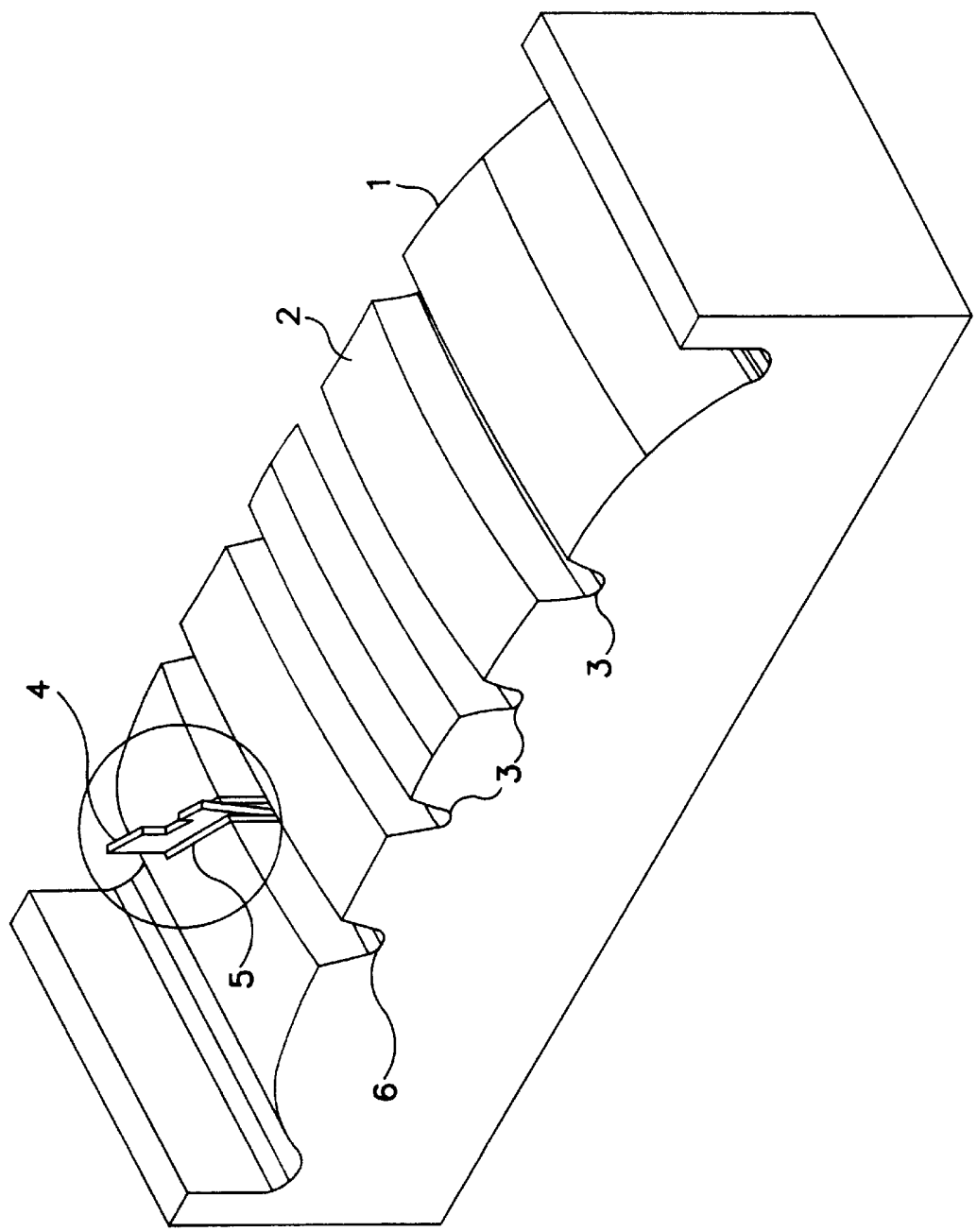
FIG. 1 is a perspective view of a countermold ready for the molding of a tire mold and having an attached metal blade.

FIG. 1 shows a metal countermold 1 intended for the casting of a mold, not visible in this figure, for the subsequent molding of a tread of a tire. The countermold 1 has a molding surface 2 the profile of which corresponds to that of the tread of a tire, and said surface 2 comprises, in the example described, several circumferentially oriented grooves 3. The countermold 1 can have imparted to it a mold-removal movement in a predetermined direction. A housing 5 is provided in the countermold 1 to receive a metal blade 4, which has been made separately; in the present case, this housing comprises four faces which are parallel in pairs, the corners formed by the intersections of said faces being parallel in a given direction corresponding to the mold-removal direction. The housing 5 debouches on one side into a groove 6 in said countermold 1.

Figure 2:
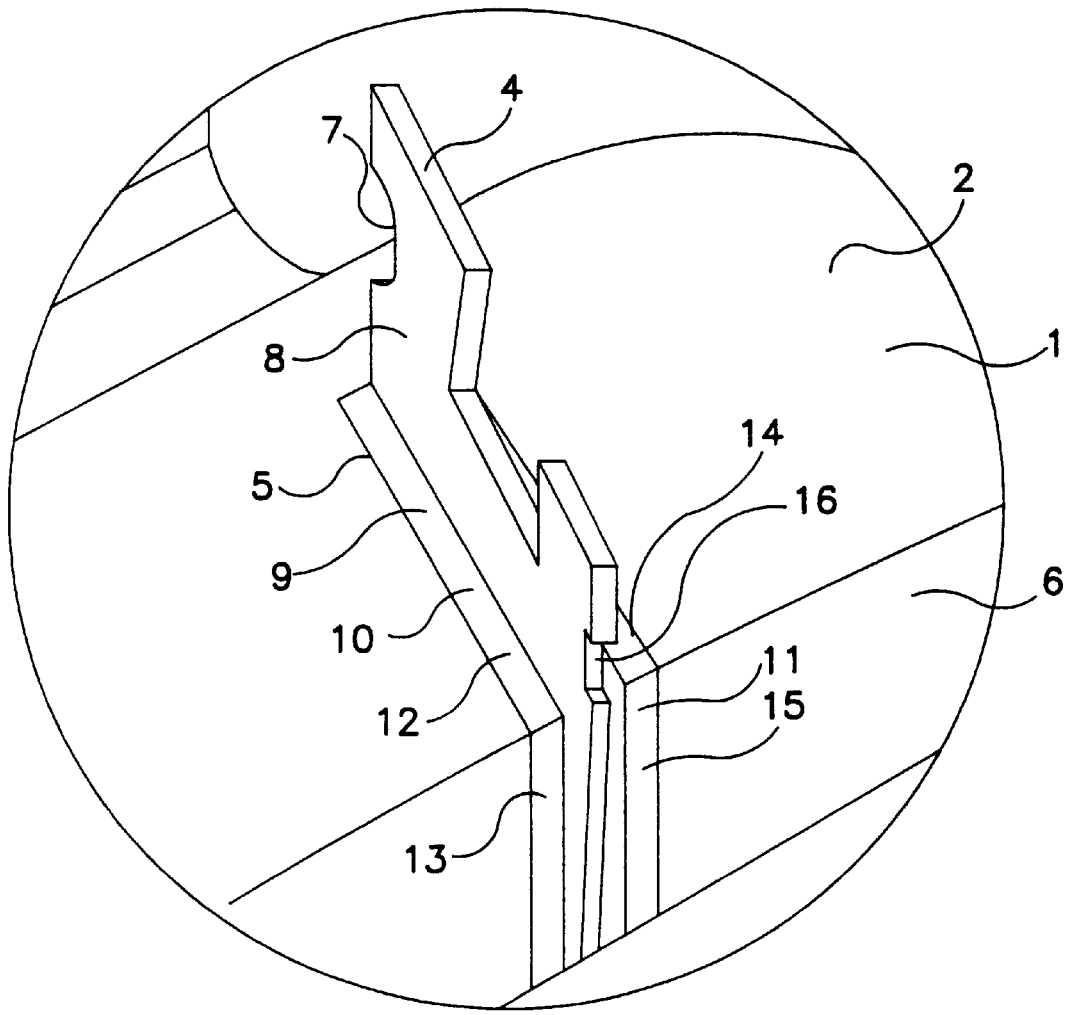
FIG. 2 is a detail view of the surface of the countermold of FIG. 1 in the vicinity of the blade.

FIG. 2 shows a detail view of FIG. 1 in the vicinity of the blade 4 in place in its housing 5, said blade extending in part through one of the lateral sides of the housing into the groove 6. A portion 8 of the blade 4 is located on the outside of the countermold 1 with respect to the molding surface 2 so as to be able to be embedded in the pouring material of the mold. In this portion 3, there are produced notches 7, 16 intended to assure a better anchoring of the blade 4 in the mold.

The portion 8 of the blade 4 is extended by a portion, not visible in FIGS. 1 and 2, which is clamped between metal parts 10 and 11 to form a drawer assembly 9. In FIG. 2 this drawer assembly is introduced into the housing 5 and is in a position ready for the effecting of the casting of a mold.

The faces 12, 13, 14, 15 of said parts 10 and 11 are machined so as to be able to assure the continuity of the molding surface 2 of the countermold 1 in the vicinity of the blade 4 once the drawer assembly is in place in the housing 5, thus avoiding the penetration of the pouring material into the housing.

Figure 3:
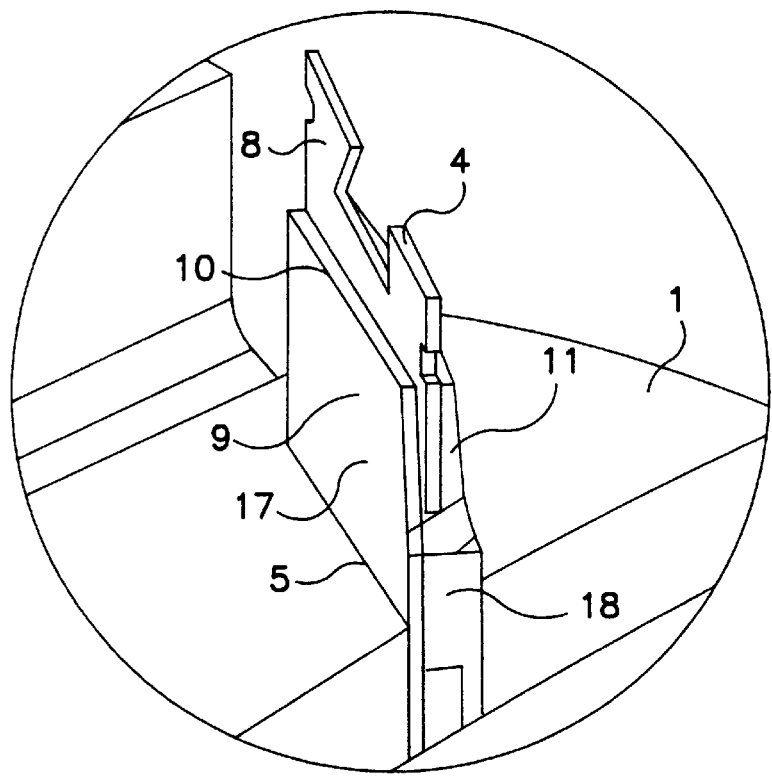
FIG. 3 is a detail view of the surface of the countermold of FIG. 1, in which a drawer assembly including a blade has been partially introduced.

In order to facilitate an understanding of the invention, FIG. 3 shows this same drawer assembly 9 in position partially introduced into its housing 5.

The drawer assembly 9 is formed of two parts 10 and 11 which clamp the blade 4, only the portion 8 of which is visible. In the position shown, only two side faces 17 and 18 of the drawer assembly 8 can be seen; these faces, as well as the opposite faces of the drawer assembly are parallel to the faces of the housing 5 located opposite each other. The presence of suitable play between the assembly and the housing permits easy movement of said assembly in its housing in the direction of removal from the mold while assuring an excellent positioning of the blade 4 with respect to the countermold 1, without however permitting infiltration of the casting material forming the mold into the housing 5.

After solidification of the molding of the mold, the portion 8 of the blade 4 being then firmly anchored in said mold, it is possible, by displacing the countermold in the mold-removal direction and in the direction opposite the mold to extract the drawer assembly 9 from the countermold 1. Thereupon, the portion of the blade 4 clamped in the drawer assembly 9 is freed.

Figure 4:
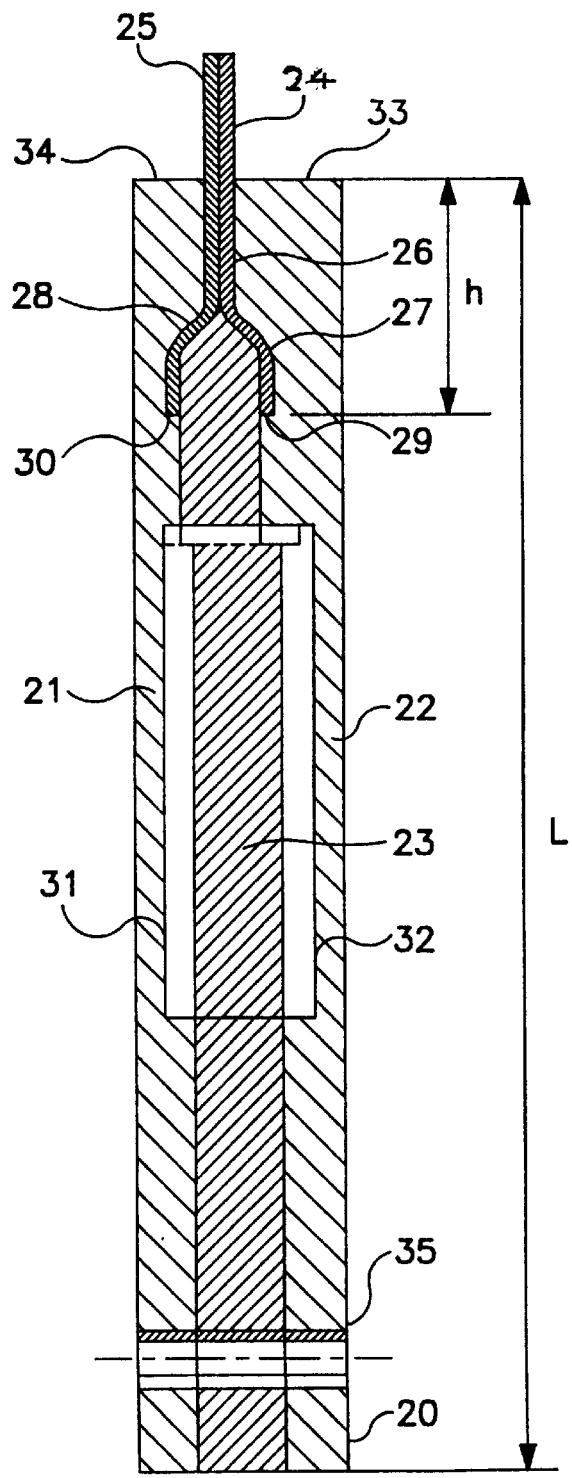
FIG. 4 is a sectional view of a device for putting in place a blade of Y-shaped cross section.

FIG. 4, in a view along a cross section taken along a plane containing the mold-removal direction, shows a drawer assembly 20 in which there is partially clamped a blade 24 at least one section of which, seen along this section plane, has the shape of a Y. On this cross section, the blade 24 is formed of a tail which is extended by two branches so as to from a Y.

The device employed in order to form the drawer assembly 20 comprises three metal parts 21, 22, 23 machined and assembled in such a manner as to clamp a first portion 26 of the blade 24 formed of the branches of the Y and a portion of the tail, the second portion 25 extending the first portion towards the outside of said drawer assembly.

This drawer assembly 20, if one excepts the portion 25 of the blade 24, has a cross section (shown in FIG. 4) of rectangular shape the large side of which has a length L which is greater than the maximum dimension h, measured in the same direction as the length L, of the portion 26 of the blade clamped in said assembly 20. Furthermore, the parts 21 and 22 are machined in such a manner as to be able snugly to fit the geometries of the side faces 27 and 28 and the geometries of the end faces 29 and 30 of the branches of the Y of the blade; finally, the part 23 which is inserted between the parts 21 and 22 is made in such a manner as to fill the regions located between the two branches of the blade 24, snugly fitting their facing inner faces.

The three parts 21, 22, 23 which, together with the blade 24, form the drawer assembly 20 are held firmly assembled by fastening means 35, such as pins, arranged close to the lower base of said assembly 20, that is to say on the end opposite the blade 24. Recesses 31 and 32, made in the parts 21 and 22, respectively, in their central portions and facing the intermediate part 23, make it possible to increase the flexibility in transverse flexure of the parts 21 and 22. It is thus possible to introduce and release the blade 24 by elastically moving the ends 34 and 33 of the parts 21 and 22 away from each other, said ends being located opposite the fastening means 35, without having to disassemble said assembly.

Figure 5:
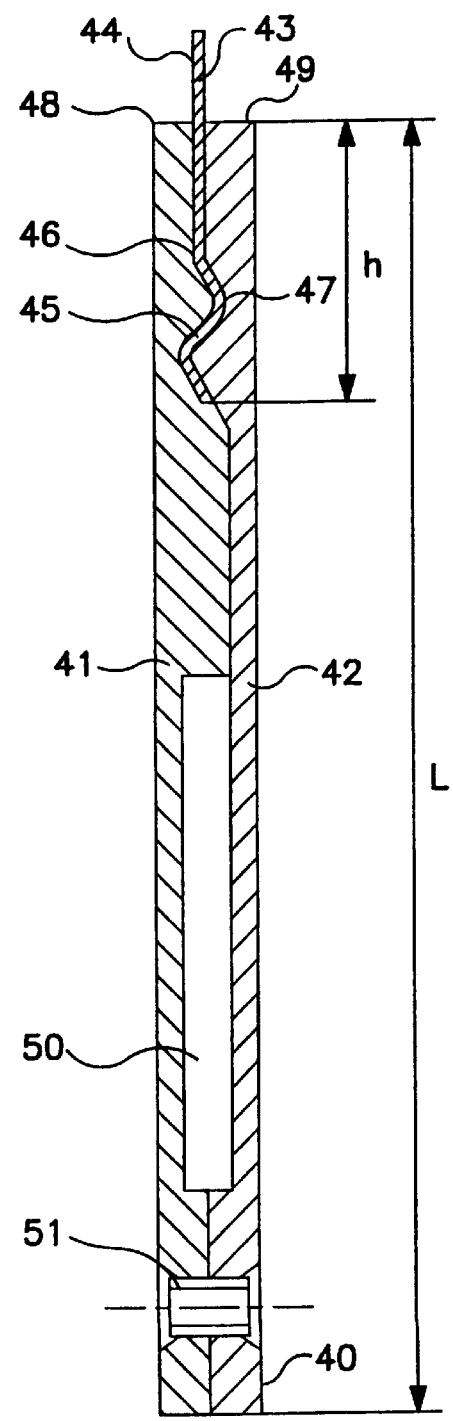
FIG. 5 is a sectional view of a device intended for placing and removing a blade a cross section of which has undulations.

FIG. 5 shows the cross section of a blade 43 formed of two portions 44 and 45, the portion 45, which is corrugated in the sectional plane of the figure, being clamped between the two opposite faces 46 and 47 of the two metal parts 41 and 42 in order to constitute a drawer assembly 40. This drawer assembly 40 has, in the sectional plane of the figure, if one disregards the portion 44 of the blade 43, a rectangular cross section the large side of which has a length L which is greater than the maximum dimension h measured in the same direction as the length L of the first portion 45 of the blade 43.

Assembly means, such as pins 51, are positioned close to the end of the drawer assembly opposite the blade to assure the holding together of the assembly while permitting an elastic transverse moving apart of the ends 48 and 49 of the parts 41 and 42 located in the vicinity of the blade 43 in order to remove the latter from the drawer assembly 40 or to insert it. As in the case of FIG. 4, this opening movement, caused for instance upon the extraction of the blade 43 from the assembly 40 by pulling on said blade, is facilitated by the presence of a recess 50 provided on the inner face 46 of the part 41 so as to increase the flexibility of the part 41 in transverse flexure under the effect of said movement.

It can be noted that the device of the invention is also adapted to the case of blades which, seen in cross section, have shapes identical to those of the blades which have just been described but which furthermore may have either undulations in another plane or variations in geometry from one cross-sectional plane to another cross-sectional plane. It may be useful to produce parts in which the shapes of the surfaces opposite the faces of the blade to be clamped reproduce or come close to the geometry of said blade faces.

Figure 6:
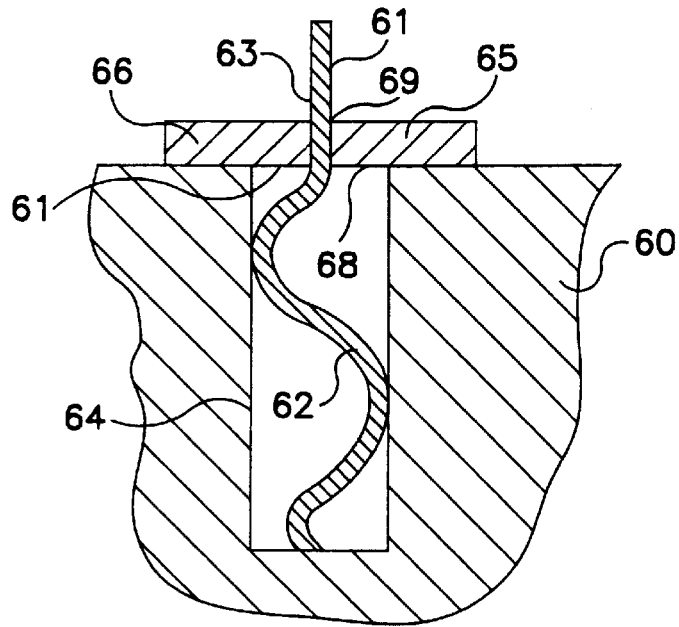
FIG. 6 is a view in cross section of a housing made in a countermold into which there is partially introduced a blade the portion of which outside said countermold is in part clamped in a device intended to close said housing.

FIG. 6 shows in cross section another embodiment of a device which permits the production of a mold by molding on a countermold 60, said countermold 60 having at least one non-removable blade 61 and having an undulated portion 62 in the sectional plane of the figure. The device of the invention comprises two metal parts 65 and 66 which can be assembled with the blade 61 so as to produce a drawer assembly 69. The portion 63 of the blade 61 in the extension of the first portion 62, located on the outside of the housing, is clamped over only a portion of its length between the two metal parts 65 and 66.

The portion 62 of the blade 61 is, after production of the drawer assembly 69, introduced into a housing 64 the projection of which on the surface of the countermold along a removal direction corresponds to the projection, in said direction, of all the points of the portion 62 on said surface.

The parts 65 and 66 have faces 67 and 68 which are intended to come partially into contact with the molding surface of the countermold on opposite sides of the opening of the housing 64 on said surface. The faces 67 and 68 are furthermore made in such a manner that their geometry corresponding to the geometry of the mold in the vicinity of the blade 61 and in such a manner as to close the entire opening of the housing 64 on the molding surface of the countermold.

The device comprising the parts 65 and 66, assembled to the blade 61 so as to produce a drawer assembly 69, thus permits the production of a mold by the pouring of a castable material on the countermold 60, the casting material surrounding both the portion 63 of the blade 61 and the parts 65 and 66 of the said device which are assembled on said portion. In order to avoid any movement of the blade 61 during the casting operation, one can, for example, provide a temporary glued joint between the contact surfaces of the countermold and the parts 65 and 66. By temporary, there is to be understood a glued joint which assures sufficient holding of the parts 65 and 66 on the surface of the countermold during the pouring of the material constituting the mold without, however, preventing the ungluing at the time of the removal of the molds after solidification.

The devices described assure the removability of the blades and the holding of them during the pouring of the mold and furthermore offer the advantage of permitting a good positioning of said blades with respect to the countermold; it is, in fact, easy to produce in the countermold housings the dimensions of which are perfectly adapted to those of said devices, each blade being perfectly positioned with respect to the part or parts constituting the device surrounding said blade.

Another advantage of the process of the invention is that, while the countermold even retains the housings already produced, it permits a change in the shape of the molding elements by adapting for any new shape the number and geometry of the parts for forming the drawer assembly, said assembly having, of course, dimensions which are compatible with the dimensions of the corresponding housing in the countermold.

The present invention also relates to a countermold which can be reused, at least one surface of which is used in order to mold, by means of a pourable and solidifiable material, a mold which in its turn is used to at least partially mold a tread of a tire having a tread pattern of given form, said countermold having at least one molding element for molding a non-removable motif. Said molding element protrudes from the molding surface of the countermold and is produced separately. The countermold of the invention is characterized by the fact that it comprises, in the vicinity of each non-removable molding element, a housing which is inserted into the molding surface, said housing permitting the putting in place of a drawer assembly formed by the assembling of at least one part with the molding element and its removal, said drawer assembly having a surface which assures the continuity of the surface of the countermold in the vicinity of said element.

Finally, the invention also relates to a tire molded with a mold made in accordance with the process of the invention and comprising a tread provided with incisions molded by blades of non-deformable shape. For such a tire and around said incisions, the surface of the tread has traces located at the encounter between the surface of the countermold and the means assuring the continuity of said surface at the time of the casting. These traces are the reflection of the contours of the housings of the molding elements which were originally marked on the mold before being marked on the tread. It is to be noted that these traces, insofar as they are visible on the tread of a new tire, disappear very rapidly after a few miles of travel of said tire and definitely do not cause any decrease in the quality of the molded tread.

I claim:

1. A device permitting placement and removal of at least one molding element in and out of a housing of a countermold which has a molding surface for molding, by means of a pourable casting material, a mold of a portion of a tread of a tire, said housing being formed in the countermold at a position for accommodating the molding element, each molding element including two portions having a common frontier, a first portion defining a non-removable motif and a second portion located in the extension of the first portion, said second portion protruding from the molding surface of said countermold, said device comprising at least one part which is placed in contact with the molding element at least at the frontier between the first portion and the second portion to form a drawer assembly in the housing, which assembly, in a first step, is introduced into said housing, leaving the second portion of the molding element protruding from the countermold, said assembly, once in place in said housing, assuring the continuity of the surface of the countermold in the vicinity of the molding element while preventing the introduction of the pourable casting material into the housing during the casting of the mold and, in a second step, after solidification of the pourable casting material and extraction of the drawer assembly from said housing, is disassembled in order to release the said at least one part from the molding element, and in which the part in contact with the molding element to form the drawer assembly is a single part and is made by molding a pourable and solidifiable material around the first portion of said molding element, said pourable and solidifiable material being separable from the molding element.

2. A device according to claim 1, characterized by the fact that the material constituting the part surrounding the molding element confers on said part elastic properties which permit the assembling and disassembling of said part and of the molding element by simple elastic deformation of said part.

3. A device according to claim 1, characterized by the fact that the drawer assembly is composed of several parts surrounding the first portion of the molding element, said drawer assembly having a sufficient elasticity of deformation in order to permit either the holding in place or the easy release of said first portion in the drawer assembly, without having to disassemble said assembly, part by part.

4. A reuseable countermold at least one surface of which is used to mold a tire tread mold which in turn is used to mold at least part of a tread of a tire with a tread pattern of given shape, said countermold comprising at least one molding element having a portion protruding from the molding surface of the countermold which protruding portion is to be anchored in the tire tread mold, a housing formed in the molding surface of the countermold for receiving a molding part of the molding element which is inserted into the housing in the molding surface of the countermold, and a drawer assembly accommodated in the housing and formed by assembling at least one part of the drawer assembly with part of the molding element, said drawer assembly assuring the continuity of the surface of the countermold in the vicinity of said molding element intermediate the housing and the molding element and facilitating the removal of the molding element from the housing as part of the mold for molding the tire tread, and wherein the part of the drawer assembly that is assembled with the molding element is a single part molded around at least a portion of said molding element by means of a pourable and solidifiable material, said material being separable from the molding element.

5. A reuseable countermold at least one surface of which is used to mold a tire tread mold which in turn is used to mold at least part of a tread of a tire with a tread pattern of given shape, said countermold comprising at least one molding element having a portion protruding from the molding surface of the countermold which protruding portion is to be anchored in the tire tread mold, a housing formed in the molding surface of the countermold for receiving a molding part of the molding clement which is inserted into the housing in the molding surface of the countermold, and a drawer assembly accommodated in the housing and formed by assembling at least one part of the drawer assembly with part of the molding element, said drawer assembly assuring the continuity of the surface of the countermold in the vicinity of said molding element intermediate the housing and the molding element and facilitating the removal of the molding element from the housing as part of the mold for molding the tire tread, and wherein the drawer assembly is formed of several parts surrounding a portion of the molding element, said drawer assembly having a sufficient elasticity of deformation to permit the putting in place and the easy release of the drawer assembly without having to disassemble said assembly part by part.

* * * * *